United States Patent [19]

Combastet

[11] Patent Number: 4,620,791
[45] Date of Patent: Nov. 4, 1986

[54] LIGHT PROCESSOR

[76] Inventor: Michel P. Combastet, 25 rue du fg Saint-Honoré, Paris, France, 75008

[21] Appl. No.: 627,733

[22] Filed: Jul. 3, 1984

[51] Int. Cl.$^4$ ............................ G01J 3/46; G01J 3/26
[52] U.S. Cl. ..................................... 356/420; 362/293
[58] Field of Search ............... 356/402, 403, 407, 419, 356/420, 425; 362/293

[56] References Cited

U.S. PATENT DOCUMENTS

| | | | |
|---|---|---|---|
| 1,619,468 | 3/1927 | Gruender | 356/419 |
| 3,449,045 | 6/1969 | Roux | 362/293 X |
| 3,532,434 | 10/1970 | Jones, Jr. et al. | 356/419 X |
| 3,818,216 | 6/1974 | Larraburu | 362/393 X |
| 3,822,098 | 7/1974 | Rudder et al. | 356/407 X |
| 4,266,871 | 5/1981 | Ritzi | 356/30 |
| 4,380,791 | 4/1983 | Nishizawa | 362/293 X |

Primary Examiner—Vincent P. McGraw
Attorney, Agent, or Firm—Wenderoth, Lind & Ponack

[57] ABSTRACT

A light processor applied to the modulation of colored light, formed of a color modulated light source, includes a longitudinal modular box forming a frame and a support for the components of the source, the box being formed with windows for the passage of light beams and connection openings for control circuits, as well as devices for fixing the components of the source, and devices for assembly means with similar boxes, for providing, by superposition and/or juxtaposition, assemblies of boxes adapted to the various applications envisaged. The light source has a reflector and is mounted inside the box on a base thereof. A plurality of dichroic inclined mirrors are mounted one after the other on the base inside the box along the path of the light beam emitted by the light source, such that each dichroic mirror reflects a portion of the light spectrum emitted by the source, and transmits the remaining portion of the beam to the subsequent mirror. A plurality of elements providing modulation of the light reflected by the mirrors are positioned in windows formed in the upper portion of the box forming the output face for the beams.

4 Claims, 7 Drawing Figures

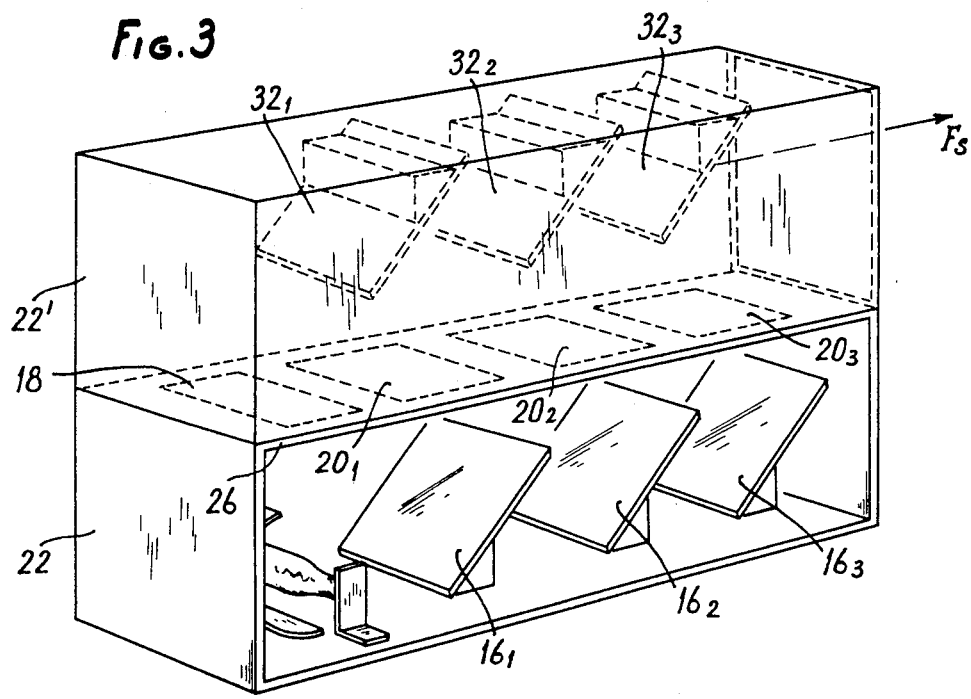
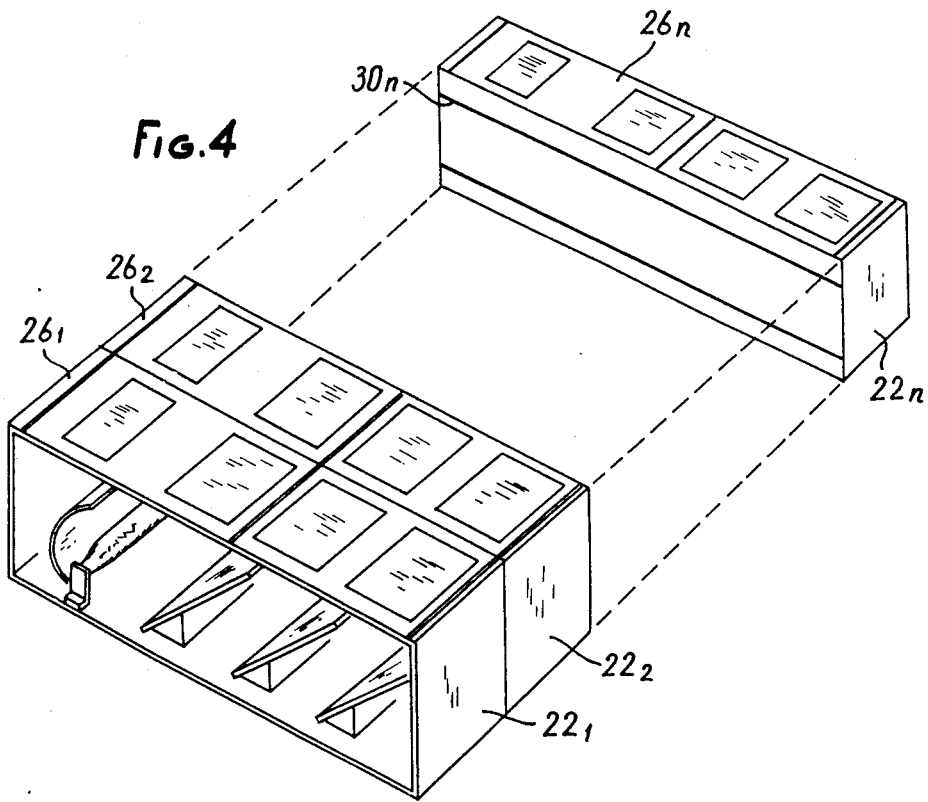

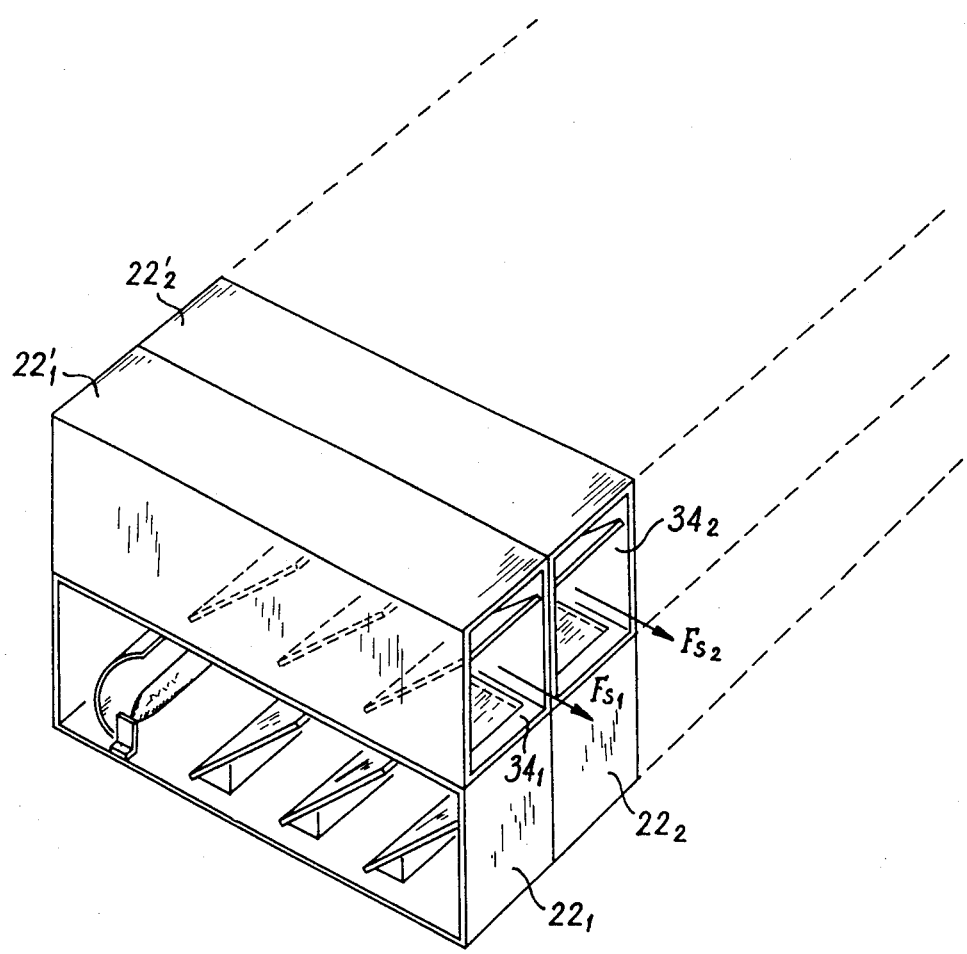

LIGHT PROCESSOR

BACKGROUND OF THE INVENTION

The present invention relates to a universal processor of white and colored light, which can be used for the modulation and/or the detection and/or measure of light.

A first aspect of the invention relates to a light processor applied to the color and brightness modulation of a light beam emitted from a typical white light source. This first aspect of the invention constitutes a universal color and intensity modulation system of light and relates more particularly to the realization of an efficient device for the production and adjustment of colored light, an economic selection of primary colors by dichroic mirrors and an electronic level adjustment via liquid crystal light valves forming a typical example of means used for composing the color and intensity of a light beam.

Domestic or industrial lighting, signaling and display, artistic effects, audio-visual therapy, biological experimentation, light projection, signal transmission by optical route, optical logic processing, colorimetry, analogic representation of sound by colors, voice control of speach by color display, etc., are possible and preferential application fields of the system according to the invention.

Light systems are known, notably for decorative lighting, using a source of light, generally white, and color filters which make it possible to obtain mixtures and combinations of colored light. It is to this type of lighting system that the present invention relates, and it broadens its capabilities to wider fields of applications.

BRIEF DESCRIPTION OF THE INVENTION

The device according to the invention, in its application for providing a source of color modulated light, comprises, in combination:
  (a) a modular box comprising fixation means for the other components, and assembly means for similar boxes, superimposed or juxtaposed, for making use of the versatility of the device;
  (b) a light source emitting typically white light, and its fixed or mobile reflector, placed on the base of the box inside the box;
  (c) a plurality of inclined dichroic mirrors, mounted one after the other on the base along the path of the light beam emitted by the light source, such that each mirror reflects a portion of the light spectrum emitted by the light source and transmits the residual spectrum to the subsequent mirrors; and
  (d) a plurality of modulation means for the colored light, placed on a wall of the box forming an output face for the light, along the paths of the portions of the beam reflected by the mirrors, the arrangement being such that the light beams exiting from the box superimpose and mix with each other at a location spaced from the box, unless beam separation outer walls are provided.

According to a second aspect of the invention, its object is a light processor applied to the detection and/or measurement of white and colored light, formed of a detector comprising, in combination:
  (a) a modular box comprising fixation means for the other components and assembly means for similar boxes, superimposed or juxtaposed, for making use of the versatility of the device;
  (b) one or several photosensitive detectors, receiving typically light selected by color filters placed at the ends of a light path and fixed to the box;
  (c) a plurality of inclined dichroic mirrors, mounted one after the other on the base of the box and inside the box along on the path of the light beams to be detected, and such that each mirror reflects a portion of the light spectrum to be detected and transmits the remaining portion to the subsequent mirrors.

According to an embodiment of the invention, the modulation means of the colored light are formed of liquid crystal cells, placed on the output face of the box, the variable light transmitting capacity of these cells being such that they play the part of light valves, progressive or simply opened or closed.

According to an embodiment of the invention, three dichroic mirrors, reflecting the blue, green and red components of the light beam emitted by the source are provided, each mirror being associated with a liquid crystal cell adjusting the intensity of each color channel. With blue, green and red primary colors, conveniently chosen, it is possible to reproduce most of the visible colors.

BRIEF DESCRIPTION OF DRAWINGS

The accompanying drawings of the present disclosure illustrate various non limiting embodiments of the invention, making apparent other features and advantages of said invention. In the drawings:

FIG. 3 is a perspective view showing the superposition of two processors,

FIG. 4 is a perspective view showing the juxtaposition of several processors,

FIG. 5 is a perspective view showing the combined superposition and juxtaposition of several processors.

DETAILED DESCRIPTION OF THE INVENTION

Figure 1:
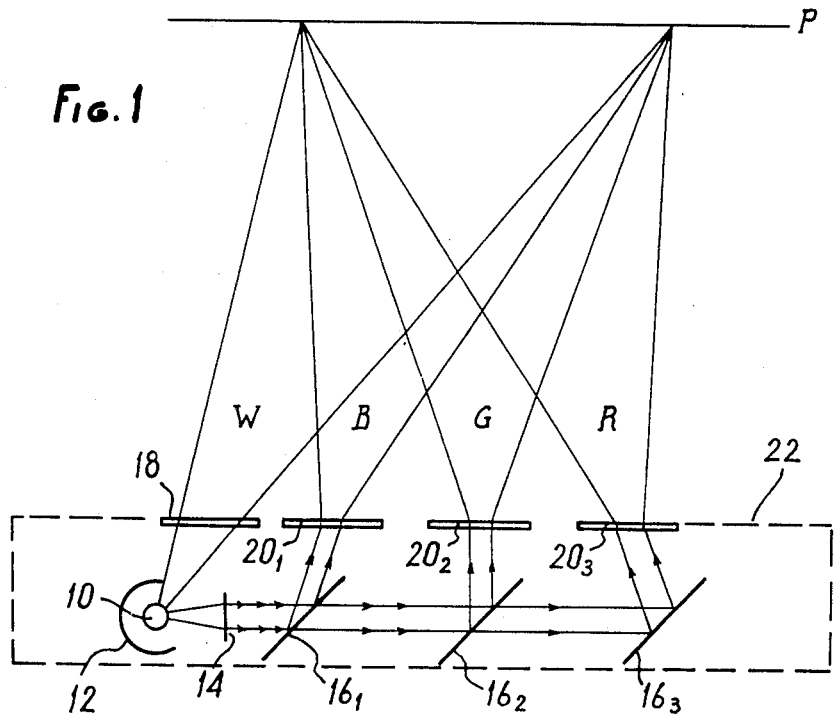
FIG. 1 is a schematic view of a processor applied to a light source modulation.

FIG. 1 shows the various components of the processor. Such processor comprises:
  (a) a longitudinal box 22, forming a frame for supporting the other components;
  (b) a light source 10 which can be a filament lamp, a laser generator, a flash bulb, etc., provided with a reflector 12 and possibly with an optical system 14;
  (c) a plurality of dichroic mirrors, placed inclined to the path followed by the light beam emitted by source 10, each mirror reflecting a light component of the input beam and transmitting to the subsequent mirror the non reflected portion of the beam. As shown in the drawing by way of a non limiting example, three dichroic mirrors $16_1$, $16_2$, $16_3$, mounted inclined at 45° with respect to the beam direction can be provided, such mirrors reflecting successively and respectively the blue, green and red B, G, R components of the input beam;

(d) a plurality of means modulating the light intensity, positioned in the paths of the beams reflected by the dichroic mirrors $16_1$, $16_2$, $16_3$. Such means are preferably liquid crystal cells $20_1$, $20_2$, $20_3$ forming light valves, selectively for each elementary color channel B, G, R, and also a cell 18 for a white light channel W in this non limiting embodiment.

The effect obtained by such a combination of components is visible at plane P of FIG. 1, in which the combined light of various beams mixes and forms the synthesis of the chosen color. Plane P can be for example the ceiling or a white wall of a room; it can also be a translucent screen.

Figure 2:
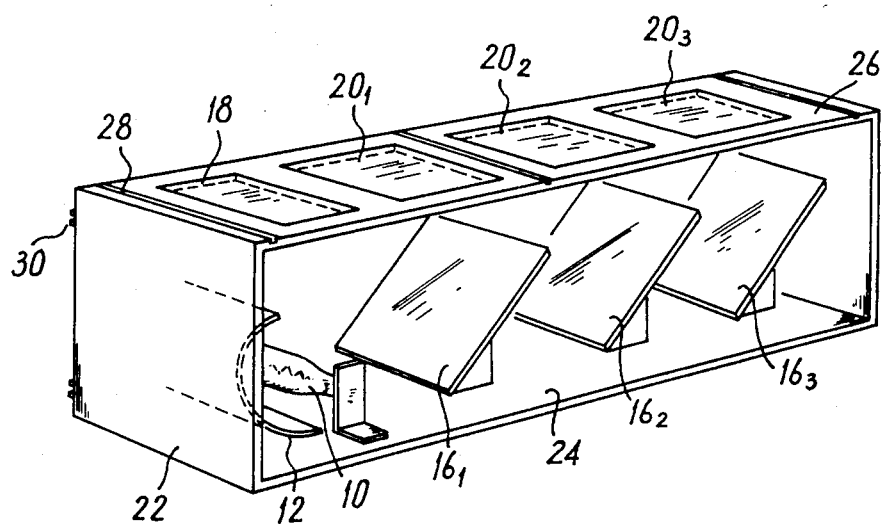
FIG. 2 is a perspective view of the processor of FIG. 1.

FIG. 2 shows an embodiment wherein the source of color modulated light according to the invention is in the form of a parallelepipedic box 22 inside which are disposed the various elements described above with reference to FIG. 1. As shown in FIG. 2, light source 10 and its reflector 12, as well as the dichroic mirrors $16_1$, $16_2$, $16_3$ are mounted on base 24 of the box via appropriate supports, and the various liquid crystal cells 18, $20_1$, $20_2$, $20_3$ are mounted in windows formed in the upper wall 26 of the box, forming the output face of the box, opposite base 24. In order to provide, as will become apparent further on, a multiple assembly of similar boxes 22, fixation and assembly means are provided such as for example slides 28 on the output face 26, and slides 30 on the side walls of box 22.

Box 22 can be made from metal, by bending a metal sheet, or from a light alloy cast under pressure, from a rigid platics material resisting impacts and high temperatures, from a composite material, etc. Light source 10 can also be a standard filament light source, or a halogen source, a flash bulb, a source of laser beam, an infrared source, an ultraviolet source, etc., or a combination of such various source types.

As can be appreciated, the invention provides a universal modulated light source, contained in a simple and economic module. To this economy are added the sturdiness, the efficiency and the reliability provided by the use of static components, without mobile parts.

The modular design allows selecting the cost of the means, according to the optical quality or to the multiplicity of color modulations, detections or measurements, according to the number of modules of the invention which are to be assembled, as shown in FIGS. 3 through 5, and according to the specifications and constraints of the projected application.

FIG. 3 shows an embodiment of an assembly formed of the superposition of two identical boxes 22, 22'. Such assembly is provided with the assistance of slides such as 28 (FIG. 2). Box 22' is substantially identical to box 22 hereabove described with reference to FIG. 2. Box 22', of identical shape to that of box 22, includes neither source nor cell, but only dichroic mirrors $32_1$, $32_2$, $32_3$ respectively associcated with mirrors $16_1$, $16_2$, $16_3$ of box 22 so as to obtain a single output beam $F_S$ directed frontwardly or rearwardly, according to whether the inclination to 45° of the mirrors is similar or symmetrical to that of mirrors of box 22. Of course, the base of box 22', applied against the upper face 26 of box 22, is formed with windows corresponding to those of box 22, in which are respectively mounted cells 18, $20_1$, $20_2$, $20_3$. Boxes 22 and 22', according to an embodiment of the invention, can be replaced by an integral box providing the same functions as boxes 22, 22' assembled to each other.

FIG. 4 shows an example of a side assembly by juxtaposition of a plurality of identical boxes $22_1$, $22_2$, ... $22_n$. In this assembly, the boxes are all identical to box 22 of FIG. 2, meaning that each of them includes a light source, a system of dichroic mirrors and of liquid crystal cells, the light output beams being emitted through windows formed respectively in faces $26_1$, $26_2$, ... $26_n$ of the various boxes. The boxes are assembled side by side by using slide rails such as $30_n$. Thereby is obtained a projection of a multitude of composed colored light beams, side by side.

FIG. 5 shows an assembly obtained by the combination of the assemblies of FIGS. 3 and 4. In fact, this system is obtained by a side by side lateral assembly of pairs of superimposed boxes 22, 22' of the type of FIG. 3. In this assembly, the lower boxes $22_1$, $22_2$, ... of each pair comprise all the components hereabove described with reference to FIG. 2, and the upper boxes $22'_1$, $22'_2$, ... (identical to box 22' of FIG. 3) comprise only dichroic mirrors, mounted so as to transmit a single light beam $F_{S1}$, $F_{S2}$, etc., for each pair respectively through the output faces $34_1$, $34_2$, .... In this variant, the upper boxes form the merging modules of the beams separately reflected in the lower boxes.

Figure 6:
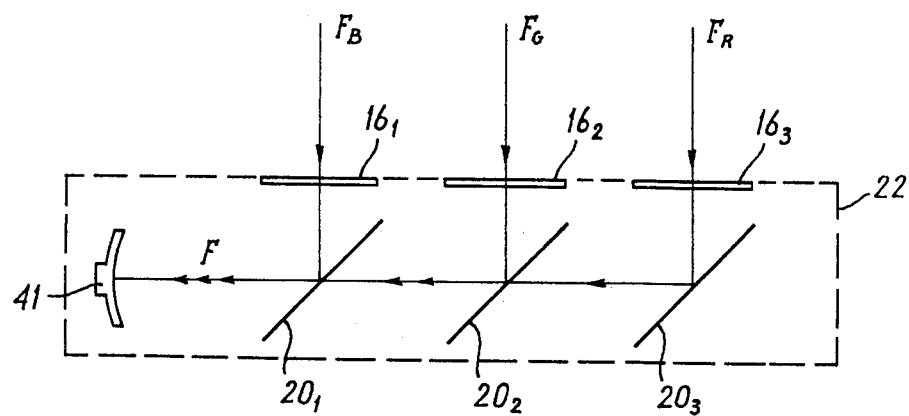
FIG. 6 is a schematic view of the processor applied to the concentration of light signals of one detector

FIG. 6 shows an application of the module to the concentration and detection and/or measurement of transmission optical channels for an assembly example regrouping three optical beams $R_B$, $F_G$ and $F_R$, which can be interrupted by cells $16_1$, $16_2$, $16_3$, and reaching a photo-detector 41 after reflection on the dichroic mirrors $20_1$, $20_2$, $20_3$.

Figure 7:
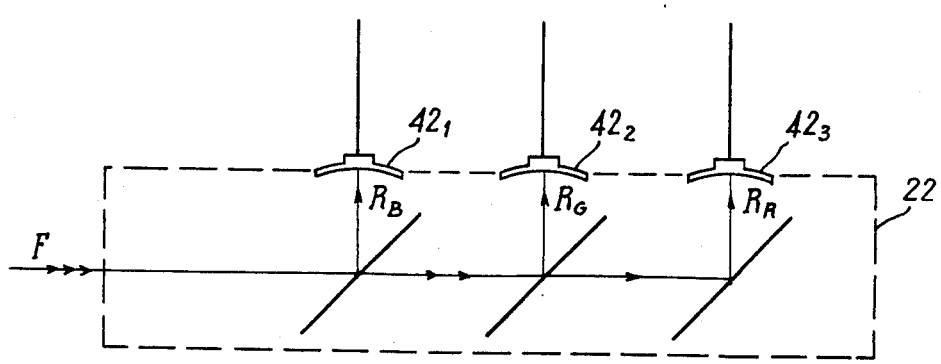
FIG. 7 is a schematic view of the processor applied to the separation of signals intended to be detected or measured.

FIG. 7 shows the application of the module according to the invention to the separation and detection and/or measurement of transmission optical channels with the assistance for example of an assembly in which the composed light beam F coming from outside box 22 penetrates parallel to the longitudinal axis of the box, through a face at the end of the box, and reaches the dichroic mirrors separating it into beams $R_B$, $R_G$, $R_R$ by reflection directing each of them to a respective photo-detector $42_1$, $42_2$, $42_3$ placed in the position hereabove mentioned of a liquid crystal cell (for example in FIG. 6).

APPLICATIONS OF THE INVENTION

It will be appreciated that the modular source which is the object of the present invention makes it possible to obtain a plurality of light systems for the above already mentioned applications. The variety of possible systems results on the one hand from the various equipment combinations of components of the boxes, and on the other hand from the various assembly combinations of the boxes, by juxtaposition and/or superposition.

The characteristics of the box, those of the liquid crystal cells, those of the dichroic mirrors and of the source makes it possible, from the module thus provided, to obtain simple or multiple light beams, the color and intensity of which can be adjusted with precision and rapidly. For instance, a signal, as weak as 1 $\mu$W, an modulate the light of a few hundred watt source in less than 10 msec. Finally, the size of the modular box and that of its components can be adapted to the magnitude of the application, for example from the size of a theater projector to that of discrete or integrated components of an electronic printed circuit card.

Hence there is provided the multiplicity of applications in the fields of:

Domestic or industrial lighting, signaling and display, artistic effects, audio-visual therapy, biological experimentation, light projection, signal transmission by optical route, optical logic processing, colorimetry, analogic representation of sound by colors, voice control of speach by color display, etc.

What I claim is:

1. A light processing apparatus comprising:
   a longitudinal modular box having a base and a planar wall spaced from and parallel to said base, said planar wall defining an outer surface of said box, and said planar wall having therein a plurality of windows;
   a white light source mounted on said base within said box;
   a plurality of dichroic mirror means, mounted on said base within said box along a longitudinal path of a light beam from said source and inclined to said path, for reflecting partial beams of respective portions of the light spectrum and transmitting along said path to sucessive said mirror means respective remaining portions of the light spectrum;
   a plurality of liquid crystal cell means, mounted in respective said windows of said planar wall, for modulating respective said partial beams toward a position spaced from said box;
   an additional similar liquid crystal cell means, mounted in a respective said window of said planar wall, for modulating a beam of the white light from said source to said position;
   all of said liquid crystal cell means extending in the same plane; and
   means on said box for the superposition or juxtaposition mounting of other boxes of light processing apparatus.

2. An apparatus as claimed in claim 1, comprising three said dichroic mirror means for reflecting to respective said liquid crystal cell means respective blue, green and red partial beams.

3. An apparatus as claimed in claim 1, wherein said mounting means comprise slide rails.

4. A light processing assembly comprising a plurality of apparatuses according to claim 1 juxtaposed side-by-side and removably connected by slide rails, thereby emitting a plurality of side-by-side modulated light beams.

* * * * *